March 23, 1937.  A. I. LOGETTE ET AL  2,074,927
APPARATUS FOR DISPENSING LIQUID FUELS, LUBRICATING OILS, AND THE LIKE
Filed Nov. 12, 1935    3 Sheets-Sheet 3
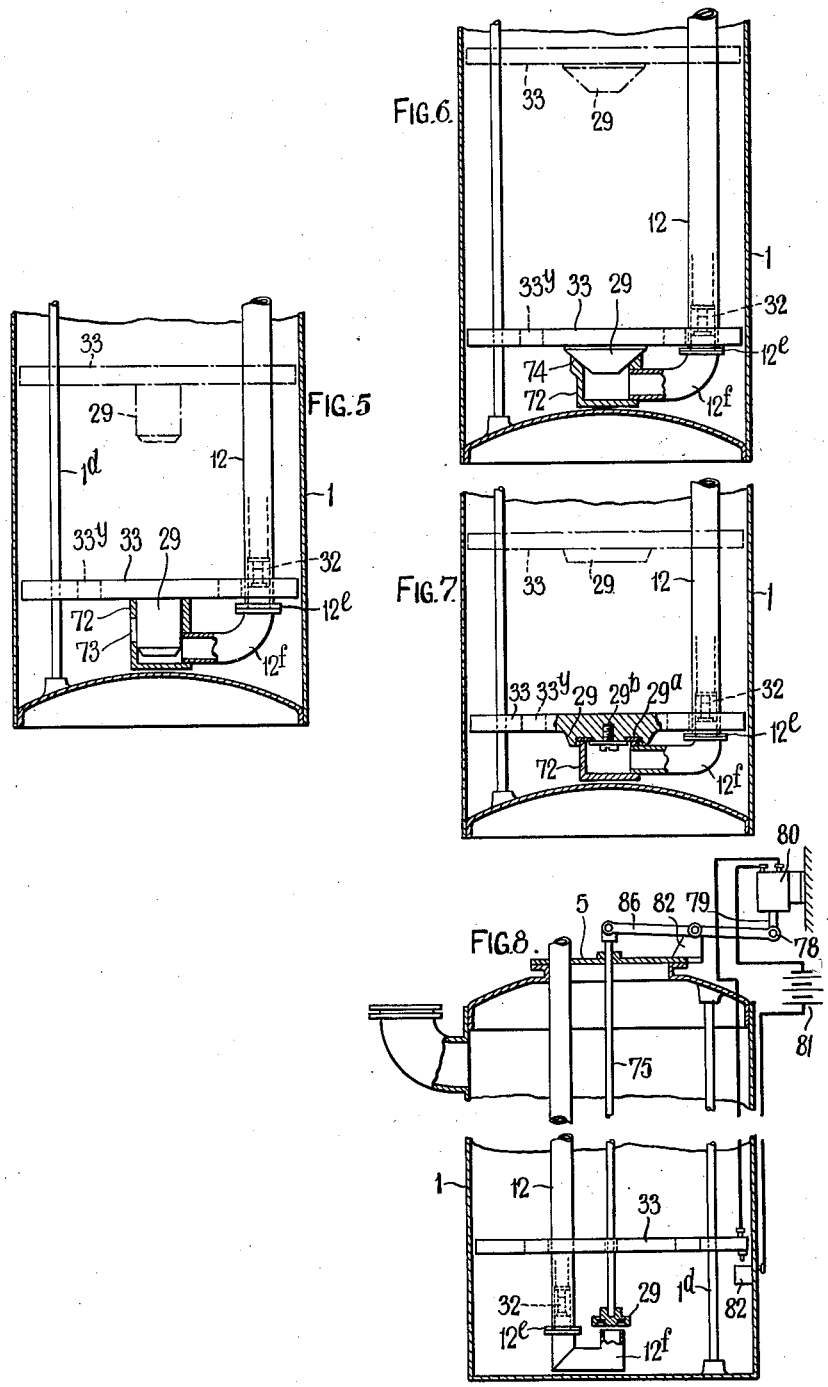
INVENTORS- A.I. LOGETTE.
E.H. DAINTON.
per R.N. Bowden
Attorney.

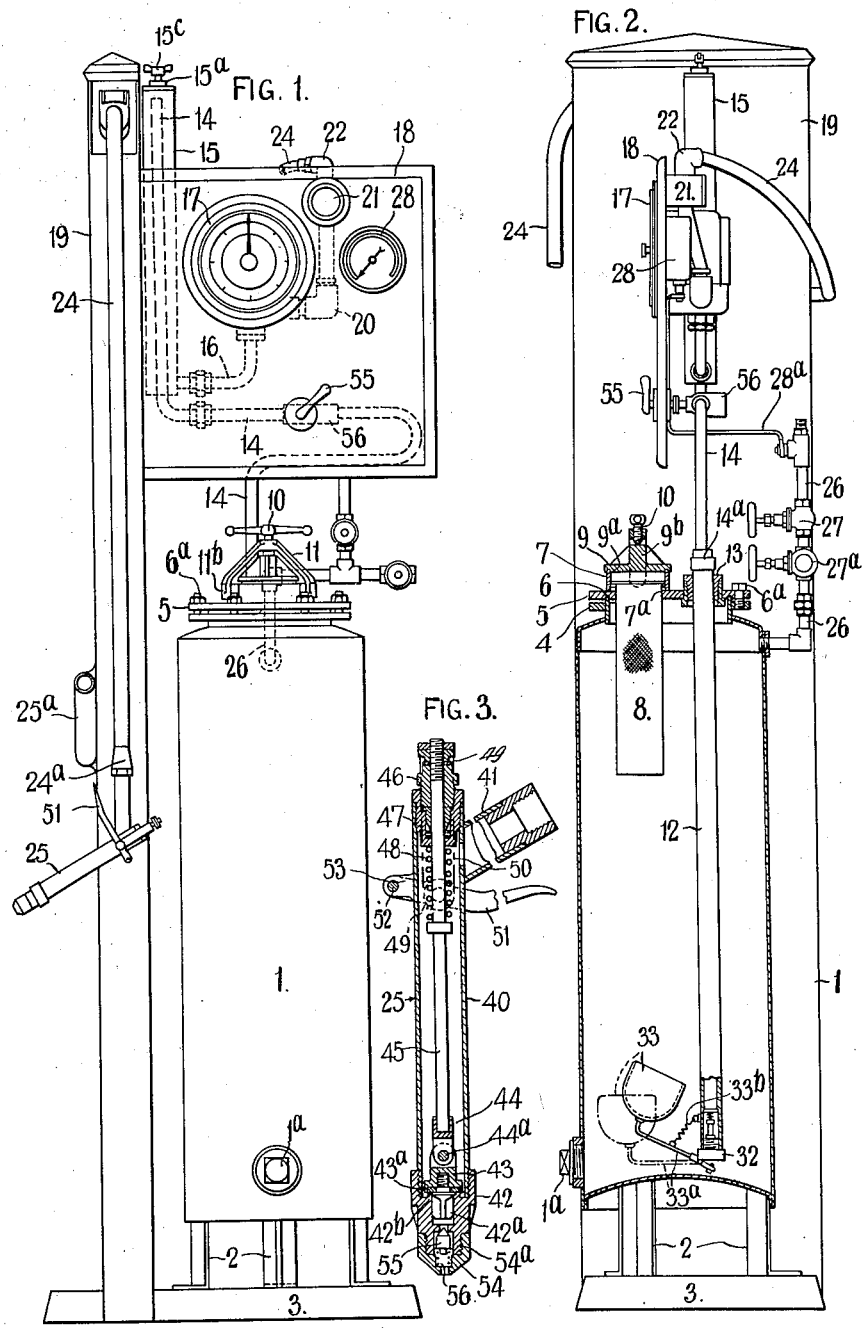

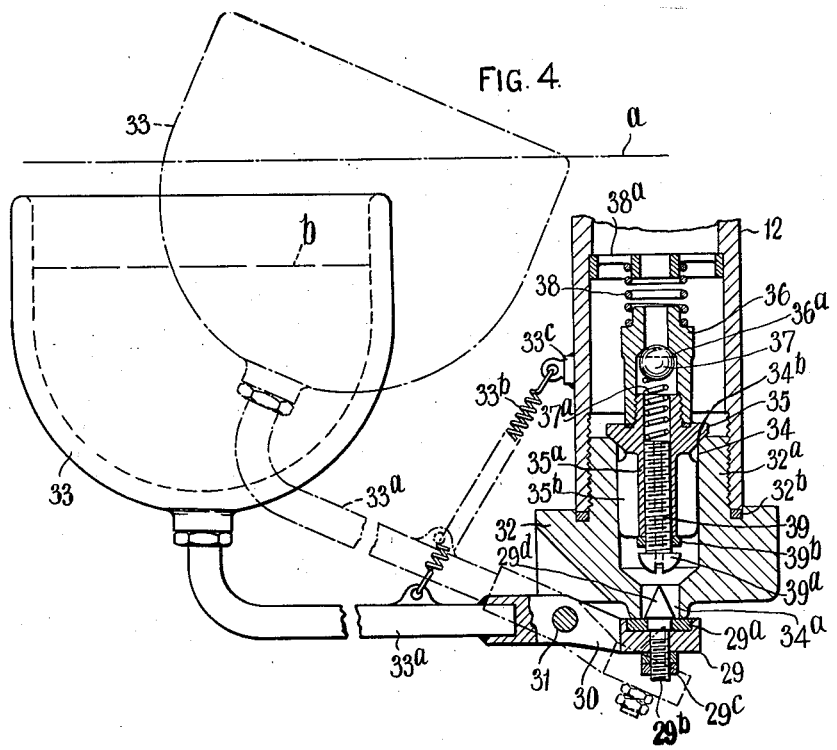

Patented Mar. 23, 1937

2,074,927

UNITED STATES PATENT OFFICE 2,074,927

APPARATUS FOR DISPENSING LIQUID FUELS, LUBRICATING OILS, AND THE LIKE

Abraham Isaac Logette and Edgar Harry Dainton, London, England

Application November 12, 1935, Serial No. 49,426 In Great Britain November 14, 1934

7 Claims. (Cl. 221—95)

This invention relates to apparatus for dispensing liquid fuels, lubricating oils and the like in garages, service stations and so forth, in such manner as to ensure delivery of the correct amount of petrol, oil or the like to the consumer, while preventing loss or waste thereof.

Objects of the invention are to provide means which automatically prevent the delivery from the container of the oil or other liquid to be dispensed when the level of such liquid falls to a pre-determined minimum level at which the outlet or draw-off port of the container is still completely submerged by the residual liquid so as to prevent air entering the delivery and metering system through which the liquid is dispensed from the container, and to provide automatic check valves at each end of the delivery and metering system adapted to maintain the same fully primed with the oil or other liquid to be dispensed, and thus prevent formation of air locks or air pockets therein.

Broadly stated, the invention consists in the combination with a float-controlled valve arranged within the container at the constantly submerged end of the draw-off pipe of the delivery system of automatic check valves at each end of the delivery and metering system, which valves are equally loaded and adapted to prevent escape of liquid from the delivery and metering system, and consequent entry of air when the pressure therein falls below a predetermined minimum.

The float may be arranged in direct operable connection with the outlet valve, or indirectly therewith through a solenoid or other electric device operably connected with the valve so that in either case the submerged outlet or draw-off port of the container is sealed by the outlet valve when the liquid reaches a predetermined minimum level, by the consequent fall of the float.

The invention is further described with reference to the accompanying drawings, wherein similar references indicate like parts.

Fig. 1 is a front elevation, and Fig. 2 a side view partly in section of one embodiment of the invention in apparatus for storing and delivering oil or other liquid under compressed air pressure. Figs. 3 and 4 are detail views drawn to enlarged scales illustrating constructional details of the apparatus illustrated in Figs. 1 and 2, and hereinafter more particularly referred to.

Figs. 5, 6 and 7 are diagrammatic sectional views illustrating modified constructions, in accordance with the present invention, applied to containers for storing and delivering oil or other liquid under pressure. Fig. 8 is a diagrammatic sectional view of a further modification in which the outlet valve is operably connected to a solenoid, the circuit of which is controlled by a float.

In the construction illustrated at Figs. 1 and 2 of the drawings, the apparatus comprises a steel container 1 mounted on a pedestal 2 secured to the base 3. The top of the container is formed with an external opening having a flange 4 which is sealed by a cover 5 furnished with an annular packing 6 and secured to the flanged opening by screw studs 6a.

The cover is furnished with a filling nozzle 7 internally flanged at 7a so as to support an externally flanged wire gauze filter 8 suspended therein in known manner.

The filling aperture is provided with a cover 9, the inner side of which is furnished with an annular packing 9a, and its upper surface with a crosspiece 9b, which forms an abutment for the screw 10 mounted in the internally threaded boss 11a in the yoke 11 pivoted on trunnions 11b mounted externally of the filling nozzle.

The container is furnished with an outlet or draw-off pipe 12 which passes through an aperture in the container cover 5 in which the draw-off pipe is secured by means of a gland and stuffing box 13, so that the draw-off pipe is suspended in the container and extends near to the lower end thereof.

The outer end of the draw-off pipe is coupled by a union 14a with a pipe 14 that terminates in an air trap 15, which latter is connected by a pipe 16 to a standard flow meter 17.

The air trap 15 and flow meter 17 are mounted on a panel 18 secured to a casing 19 that is mounted upon the base 3 of the apparatus. The flow meter is connected by an outlet pipe 20 to a sight glass 21 which is mounted in the panel 18 and connected by an elbow 22 to a flexible delivery pipe 24 that is adjustably supported in the casing 19, the outer end 24a of the flexible delivery pipe being connected to a fitting 25, presently referred to, while a holster 25a is arranged upon the casing 29 to receive the fitting 25, when out of use.

The lower end of the container 1 is provided with a removable screw plug 1a for cleaning purposes, while its upper end is furnished with an inlet port through which the container is connected by pipes 26 and inlet valve 27 to a source of compressed air, not shown, the pipes 26 being also connected through a pipe 27a to an air outlet or escape valve 27b. The compressed air inlet pipes 26 are connected by a by-pass tube 28a to a pressure gauge 28 mounted in the panel 18.

The lower end of the draw-off pipe 12 is furnished with a tubular plug-like fitting that carries a float-controlled outlet valve 29. As shown at Fig. 4 the outlet valve 29 is comprised in one arm of a lever 30 mounted on a pivot 31 carried in the tubular fitting 32, the other arm of the lever 30 being furnished with an upwardly cranked extension 33a that carries a float 33.

The float 33 is an open, cup-shaped hollow vessel of metal which is filled with the oil or other liquid to be dispensed as indicated by the dotted line a, Fig. 4, the weight of the float being in part counter-balanced by a spring 33b, one end of which is attached to the lever arm extension 33a, and its other end to a strap 33c secured to the outlet pipe 12 (see Fig. 4).

The tubular fitting comprises an externally threaded plug-like extension 32a that is adapted to screw into the internally threaded lower end of the draw-off pipe 12 so that the lower edge of the draw-off pipe makes a fluid tight joint with an elastic packing 32b mounted in a groove in the tubular fitting.

The bore 34 of the tubular fitting terminates at its lower end in a reduced externally flanged opening 34a that forms the seat of the float controlled valve 29. The inner face of the float controlled valve is recessed and furnished with an elastic packing 29a that is held in position by a screw bolt 29b secured by nuts 29c, the head 29d of such bolt being coned to form a guide for the float controlled valve.

A coned valve 35 having a tubular shank 35a, and radial guide wings 35b is slidably mounted in the bore 34 of the tubular fitting so that the head of the coned valve engages a counterpart coned seating 34b on the inner end of the bore 34.

The tubular shank 35a extends above the coned valve 35 and is externally threaded to engage a counterpart internal thread formed in a tubular nipple 36, the bore of which is reduced at 36a to form a seating for a ball valve 37 housed therein.

The upper end of the tubular nipple is externally shouldered down to form a bearing for one end of a strong spiral spring 38, the other end of which engages the tubular boss of a spider 38a secured in the bore of the draw-off pipe 12.

The ball valve 37 housed in the tubular nipple is controlled by a spiral spring 37a mounted in the adjacent end of the tubular shank 35a of the coned valve. The lower end of such spring is supported by a tubular screw bolt 39 which screws into the internally threaded shank 35a of the coned valve, such bolt being furnished with a slotted head 39a so that it can be adjusted to compress the controlling spring 37a of the ball valve 37 as required to prevent escape of liquid from the delivery and metering system when the internal pressure thereof falls below the predetermined minimum to which the spring 37a is adjusted, the screw bolt being secured in its adjusted position by a lock nut 39b.

An air trap 15 is mounted at the back of the panel 18 and is closed at its upper end by a plug 15a which is perforated to form an air vent that is controlled by means of a thumb screw 15c.

The pipe 14 is secured fluid tight in the bottom of the air trap and extends to the upper end thereof, the other end of such pipe being connected with the draw-off pipe 12 of the container, as previously described.

The fitting 25 secured to the outer end of the flexible delivery pipe 24 comprises, as shown at Fig. 3, a tubular body 40 furnished with an angular extension 41 connected by a union to a flexible delivery pipe 24.

One end of the tubular body is furnished with a delivery nozzle 42 which forms a guide and seating for a spring controlled shut-off valve 43 furnished with radial guides that work in a counterpart recess 42a in the nozzle 42, and with an annular elastic packing 43a adapted to engage the annular seating 42b in the nozzle.

The body of the valve 43 is pivotally connected through a pin 44a and coupling piece 44 to a valve rod 45 that works through a stuffing box 47 and gland 46 that is screwed into the other end of the tubular body 40. The valve rod 45 is controlled by a coiled spring 48 mounted thereon between a collar 45b on the rod and the inner end of the stuffing box 47.

The spring controlled valve rod 45 is furnished at its upper end with an external stirrup 49 connected to a forked lever 51 pivoted at one end by a pin 52 to a bracket 53 secured to the body 40 of the fitting.

The delivery nozzle 42 is furnished with a centrally perforated screw cap 54 that screws on to an externally threaded tubular extension 54a of the nozzle, in which extension is housed a coned anti-drip valve 55 that is normally closed by a coiled spring 56 mounted in the perforated screw cap 54 by means of which the spring 56 is adjusted to the same tension as the spring 37a of the return valve 37 at the lower end of the inlet pipe 12 in the pressure container 1.

When the container 1 is charged with oil or other liquid, the filling aperture is sealed, and the air inlet valve 27 opened to admit compressed air into the container above the level of the oil or other liquid stored therein.

The float controlled outlet valve 29 at the lower end of the draw-off pipe is submerged and held open by the buoyancy of the open float 33, which is assisted by the spring 33b. The oil is forced through the tubular fitting against the resistance of the spring controlled coned valve 35 therein, and rises through the draw-off pipe 12 into the pipe 14 connected therewith and cascades over the upper end of the pipe 14 into the air trap 15, so that air occluded in the oil or other liquid is separated therefrom and rises to the top of the air trap, from which air can be released by slightly unscrewing the thumb screw 15c in the top of the air trap, the screw 15c being then screwed down.

The oil or other liquid passes from the air trap via the pipe 16 through the flow meter, and thence via the pipe 20, and sight glass 21 into the flexible delivery pipe 24, in which latter the liquid is retained under pressure by the shut-off valve 43 in the fitting 25 to which the flexible delivery pipe is connected.

In use, the nozzle of the fitting 25 on the delivery pipe is directed to the vessel into which the dispensed liquid is to be discharged, and the lever 51 manipulated by the operator so as to open the shut-off valve 43 against the resistance of its controlling spring 48 so that the oil or other liquid is delivered under pressure from the container 1 through the flow meter via the delivery pipe 24 and fitting 25 against the resistance of the anti-drip valve 55 to the receiver.

On releasing the lever 51 the shut-off valve 43 is closed by its spring 48 and the anti-drip valve 55 by its spring 56 to prevent liquid being trapped in the outer end of the delivery nozzle dripping therefrom.

When the shut-off valve 43 is closed, the pressure in the delivery system and draw-off pipe 12 rises to balance that in the container 1 so that the check valve 35 in the lower end of the draw-off pump automatically closes, the oil delivery system connected with the draw-off pipe thus remaining fully charged with oil at the full storage pressure.

When the oil or other liquid in the container 1 falls to a pre-determined level indicated by the dotted line b (Fig. 4 the cup-like float 33 is sufficiently uncovered to lose its buoyancy, so that the float, filled with oil, falls against the resistance of the spring 35b, and closes the outlet valve 29, while the latter, together with the fitting 32 is still submerged in the residual liquid in the container, and thus prevents compressd air passing from the container into the delivery system, should the shut-off valve in the delivery nozzle fitting 23 be opened.

In this event, oil trapped at high pressure in the delivery system would be discharged until the pressure of the trapped oil is insufficient to open the anti-drip valve 55 of the discharge nozzle 42, or the ball valve 37 at the lower end of the outlet pipe 12 of the container.

The oil or other liquid is thus trapped in the delivery system between the anti-drip valve 55 (Fig. 3) and the non-return spring controlled ball valve 37 so that the delivery and metering system remains filled with oil at a sufficient pressure to prevent the entry of air therein.

To re-charge the container with oil or other liquid to be dispensed, the compressed air inlet valve 27 is closed and the outlet valve 27b opened so as to reduce the internal pressure of the container 1 before opening the cover 9 of the filling aperture for the purpose of introducing a fresh charge of liquid, after which the container is re-closed and re-connected with the source of air pressure.

An emergency valve is arranged in the pipe 14 so that it can be controlled by a lever 55 mounted in the panel 18. For this purpose, a casing 56 is inserted in the pipe 14 for housing the emergency valve.

Figs. 5, 6, 7, and 8 illustrate modified constructions of a float controlled outlet valve applied to apparatus for storing and delivering oil and other liquid under pressure of the kind described with reference to Figs. 1 and 2. In each of these modifications, an outlet valve 29 is mounted upon the under-side of a perforated disc-like float 33 which is loosely mounted in the pressure container 1 in which it is guided by a guide rod 1d and the outlet or draw-off pipe 12 which pass through perforations in the float.

A plug-like fitting 32 carrying the check valves such as 34 and 37 described with reference to Fig. 4 is mounted in the lower end of the outlet pipe 12, which latter is also provided with an external flange 12e by which it is connected to a tubular elbow or extension 12f that terminates in a socket member 72 arranged on the bottom of the container so as to be in axial alignment with the outlet valve member 29 carried by the float 33, which is maintained in alignment by the guide rod 1d and pipe 12 as it rises and falls within the container, while relatively large perforations 37 are formed in the float to allow stored liquid to pass freely therethrough.

As shown at Fig. 5, the socket member 72 is cylindrical, and has an opening 73 formed laterally thereof, while the float controlled outlet valve 29 is in the form of a cylindrical plug with a chamfered end.

When the container 1 is charged with the liquid to be dispensed, the float 33 carrying the outlet valve members rises with and floats on the surface of the liquid, and when the liquid reaches a pre-determined low level the float falls therewith so that the valve member 29 enters the socket member 72 with the float resting on the upper edge thereof, while the aperture 73 in the socket member and the terminal of the extension 12f of the outlet pipe are still submerged in the residual liquid, so preventing the entry of air from the container into the pipe 12 and delivery system connected therewith.

In the construction illustrated at Fig. 6 the valve member 29 consists of a cone that is adapted to seat in a counterpart seating 74 formed on the upper edge of the socket member 72 when the contained liquid falls to a pre-determined level.

In the construction illustrated at Fig. 7 the valve-like member consists of a central boss formed on the under side of the float 33 in which an annular packing 29a is secured in an annular groove by a washer carried by a screw stud 29b, so that when the liquid falls to a predetermined level the annular packing 29a of the valve member seats upon the edge of the socket 72, so sealing the same.

When the container is re-charged with liquid, the latter flows freely through the perforations 33y in the latter to the under-side thereof, so that the float rises freely with the liquid in the container.

In the modification illustrated at Fig. 8, the float-controlled outlet valve 29 is carried by a guide rod 75 that works through a stuffing box in the cover 5 of the container 1, and is pivoted to one arm of a lever 86 pivoted to a bracket 77 mounted on the cover 5, the other arm of which lever is pivoted at 78 to the cone or plunger 79 of a solenoid 80, which latter is arranged in circuit with a source of electric energy, indicated at 81, and a rotary switch 82.

The perforated float 33 is independently mounted in the container 1 and is guided by a rod 1d and pipe 12 as in the constructions described with reference to Figs. 5-7, while the valve rod 75 passes freely through a perforation in the float.

A fitting 32 carrying check valves is fitted in the lower end of the pipe 12, while the pipe 12 is connected to an elbow-like extension, the open end of which is arranged in alignment with the valve 29.

The rotary switch 82 is spring controlled so that it is normally open and is arranged on the container so that the switch lever projects into the interior of the same in such a position as to be operated by the float 33 when the latter sinks with the stored liquid to a predetermined level.

When the switch lever is operated by the float, the circuit of the solenoid 80 is closed, consequently energizing the latter so that its core 79 is drawn into the solenoid, which forces the outlet valve 29 against the open end of the elbow 12f, so sealing the latter, the valve 29 being retained in the closed position until the container 1 is re-charged with liquid, so as to raise the float and release the switch lever, the switch being automatically re-opened by its controlling spring.

We claim:—

1. Apparatus for dispensing measured quantities of liquids under pressure, comprising a container connected to a source of motive fluid under pressure, such as compressed air, an outlet connected to one end of a delivery and metering system and controlled by a float-operated valve, said outlet being provided with a spring loaded return valve, a delivery nozzle having a spring loaded valve at the other end of said delivery and metering system, said spring loaded valves being adjusted to equal tensions such that both valves close when the pressure within the delivery system falls below a predetermined minimum.

2. Apparatus for dispensing measured quantities of liquids under pressure, comprising a container connected to a source of motive fluid under pressure, such as compressed air, an outlet connected to a delivery and metering system provided at each end with equally loaded automatic valves adapted to close the said delivery system when the pressure therein falls below a predetermined minimum, said outlet being provided with a valve indirectly controlled by float through an electrical device arranged in circuit with a switch adapted for operation by said float when the liquid falls to a predetermined level at which said outlet is still submerged therein.

3. Apparatus for dispensing measured quantities of liquids under pressure comprising a container connected to a source of motive fluid under pressure, such as compressed air, an outlet connected to a delivery and metering system provided at each end with equally loaded automatic valves adapted to close the said delivery system when the pressure therein falls below a predetermined minimum, said outlet being provided with a valve operably connected through links and levers to the core or plunger of a solenoid arranged in circuit with a switch adapted to be operated by a float within the container when the liquid falls to a predetermined level in the latter.

4. Apparatus for dispensing measured quantities of liquids under pressure, comprising a container connected to a source of motive fluid under pressure such as compressed air, an outlet connected to a delivery and metering system provided at each end with equally loaded automatic valves adapted to close the said delivery system when the pressure therein falls below a predetermined minimum, said outlet being provided with a valve carried on one arm of a pivoted lever, the other arm of which carries a float, said lever being pivotally mounted at the submerged outlet of the container so that the valve is held open by the buoyancy of the float while the latter is submerged, and is closed by the fall of the float with the liquid when the latter falls to a predetermined minimum level in the container, at which the outlet or draw off port remains submerged.

5. Apparatus for dispensing measured quantities of liquids under pressure, comprising a container connected to a source of motive fluid under pressure such as compressed air, an outlet connected to a delivery and metering system provided at each end with equally loaded automatic valves adapted to close the said delivery system when the pressure therein falls below a predetermined minimum, said outlet being provided with a valve mounted upon one arm of a pivoted lever, the other arm of which carries a float, said lever being mounted at the outlet of the container and controlled by a spring adapted to assist the buoyancy of the float so that the valve is held open by the float while the latter is submerged, and is closed by the fall of the float when the liquid falls to the level at which the spring-assisted float loses its buoyancy, while the outlet remains submerged in the liquid.

6. In apparatus for dispensing measured quantities of liquids, a container connected to a source of motive fluid under pressure, said container having an outlet, a float operated valve for sealing said outlet while the outlet is still submerged, a delivery and metering mechanism which includes a duct, one end of said duct being connected to said outlet and from the other end of which duct the liquid is dispensed, combined with equally loaded automatic valves, one located at each end of said duct to prevent escape of liquid and consequent admission of air when the pressure in the delivery and metering mechanism falls below a predetermined minimum.

7. A liquid dispensing apparatus including a container, a draw-off and delivery mechanism for conveying liquid from said container and discharging it at a place outside of the container, said mechanism including a duct from the container to the discharge place, a float controlled valve at the end of said duct, within the container, automatic equally loaded check valves at the respective ends of said duct in virtue of which escape of liquid from said duct is prevented and the entry of air into the said duct is prevented when the pressure in the duct falls below a predetermined minimum.

ABRAHAM ISAAC LOGETTE.
EDGAR HARRY DAINTON.